(12) United States Patent
McAuley et al.

(10) Patent No.: US 7,023,800 B1
(45) Date of Patent: Apr. 4, 2006

(54) CONGESTION AVOIDANCE WITHIN AGGREGATE CHANNELS

(75) Inventors: Derek McAuley, Cambridge (GB); Paul R. Barham, Cambridge (GB); Peter Key, Hardwick (GB); Koenraad Laevens, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/323,767

(22) Filed: Jun. 1, 1999

(51) Int. Cl.
*G01R 31/08* (2006.01)
*H04L 12/28* (2006.01)
*G01F 15/16* (2006.01)

(52) U.S. Cl. .................. 370/235; 370/236; 370/395.1; 370/410; 709/232

(58) Field of Classification Search ................ 370/235, 370/236, 229, 230, 231, 232, 410, 426, 395.1, 370/412; 709/232, 235, 229
See application file for complete search history.

(56) References Cited

U.S. PATENT DOCUMENTS

| | | | | |
|---|---|---|---|---|
| 5,280,470 A | * | 1/1994 | Buhrke et al. | 370/232 |
| 5,457,687 A | * | 10/1995 | Newman | 370/232 |
| 5,719,853 A | * | 2/1998 | Ikeda | 370/229 |
| 6,064,648 A | * | 5/2000 | Hellman et al. | 370/230 |
| 6,208,619 B1 | * | 3/2001 | Takeuchi | 370/229 |
| 6,295,294 B1 | * | 9/2001 | Odlyzko | 370/389 |
| 6,324,162 B1 | * | 11/2001 | Chaudhuri | 370/225 |
| 6,388,988 B1 | * | 5/2002 | Jabbarnezhad | 370/228 |
| 6,389,555 B1 | * | 5/2002 | Purcell et al. | 714/10 |
| 6,424,620 B1 | * | 7/2002 | Nishihara | 370/229 |
| 6,424,629 B1 | * | 7/2002 | Rubino et al. | 370/241.1 |
| 6,456,591 B1 | * | 9/2002 | Mishra | 370/229 |
| 6,456,630 B1 | * | 9/2002 | Packer et al. | 370/466 |
| 6,469,991 B1 | * | 10/2002 | Chuah | 370/329 |
| 6,512,745 B1 | * | 1/2003 | Abe et al. | 370/232 |
| 6,625,118 B1 | * | 9/2003 | Hadi Salim et al. | 370/229 |

FOREIGN PATENT DOCUMENTS

EP        0836354 A2 *  4/1998

OTHER PUBLICATIONS

Jeffrey K. MacKie-Mason, Hal R. Varian, Pricing the Internet, in B. Kahin and J. Keller, eds., Public Access to the Internet, Prentice-Hall, New Jersey, 1994.

Jon Crowcroft and Philippe Oechslin, Differentiated End-to-End Internet Services using a Weighted Proportional Fair Sharing TCP, Computer Communication Review, vol. 28, No. 3, Jul. 1998, pp. 53-69.

(Continued)

*Primary Examiner*—Hanh Nguyen
(74) *Attorney, Agent, or Firm*—Klarquist Sparkman, LLP

(57) ABSTRACT

Network congestion avoidance within aggregated channels is disclosed. In one embodiment, a method first transmits a packet associated with a first channel of a plurality of related channels from a source protocol layer (e.g., a source IP layer) of a source through a network (e.g., the Internet). Next, the method triggers an ECN event by the packet at the network. Finally, at least one channel is determined to have decreased packets transmitted therethrough, in response to the triggering of the ECN event (e.g., based on a congestion pricing criteria).

40 Claims, 5 Drawing Sheets

OTHER PUBLICATIONS

N.P. Bhatia, G.P. Szego, Stability Theorty of Dynamical Systems, 1970, Springer-Verlag, Berlin, Library of Congress Catalog Card No. 70-126892.

K. Ramakrishnan, S. Floyd, A Proposal to Add Explicit Congestion Notification (ECN) to IP, Jan. 1999, Requeset for Comments: 2481.

Damon Wishik, Pricing the Internet: Resource Pricing and the Evolution of Congestion Control, http://www.statslab.cam.ac.uk/~djw1005/Stats/Compete/, downloaded Apr. 11, 1999.

Raj Jain, K.K. Ramakrishnan, Dah-Ming Chiu, Congestion Avoidance in Computer Networks with a Connectionless Network Layer, DEC-TR-506, 1998 (version Jun. 1, 1997).

Sally Floyd and Van Jacobson, Random Early Detection Gateways for Congestion Avoidance, Aug. 1993 IEEE/ACM Transactions on Networking.

Sally Floyd, TCP and Explicit Congestion Notification, ACM Computer Communication Review, 24(5):10-23, 1994.

Matthew Mathis, Jeffrey Semke, Jamshid Mahdavi, The Macroscopic Behavior of the TCP Congestion Avoidance Algorithm, Computer Communication Review, vol. 27, No. 3, Jul. 1997.

Teunis J. Ott, J.H.B. Kemperman, Matt Mathis, The stationery behavior of ideal TCP congestion avoidance, Aug. 22, 1996.

R.J. Gibbens and F.P. Kelly, Resource pricing and the evolution of congestion control, 1998, http://www.statslab.cam.ac.uk/~frank/PAPERS/evol.html.

R.J. Gibbens and F.P. Kelly, Distributed connection acceptance control for a connectionless network, preprint, to be presented at the 16th Intl'l Teletraffic Congress, in Edinburgh, Jun., 1999, http://www.statslab.cam.ac.uk/~frank/dcac.html.

Scott Shenker, Fundamental Design Issues for the Future Internet, IEEE J. Selected Area Communications, 13:1176-1188, 1995.

FP Kelly, AK Maulloo, DKH Tan, Rate control for communication networks: shadow prices, proportional fairness and stability, Journal of the Operational Research Society, 49:237-252, 1998.

* cited by examiner

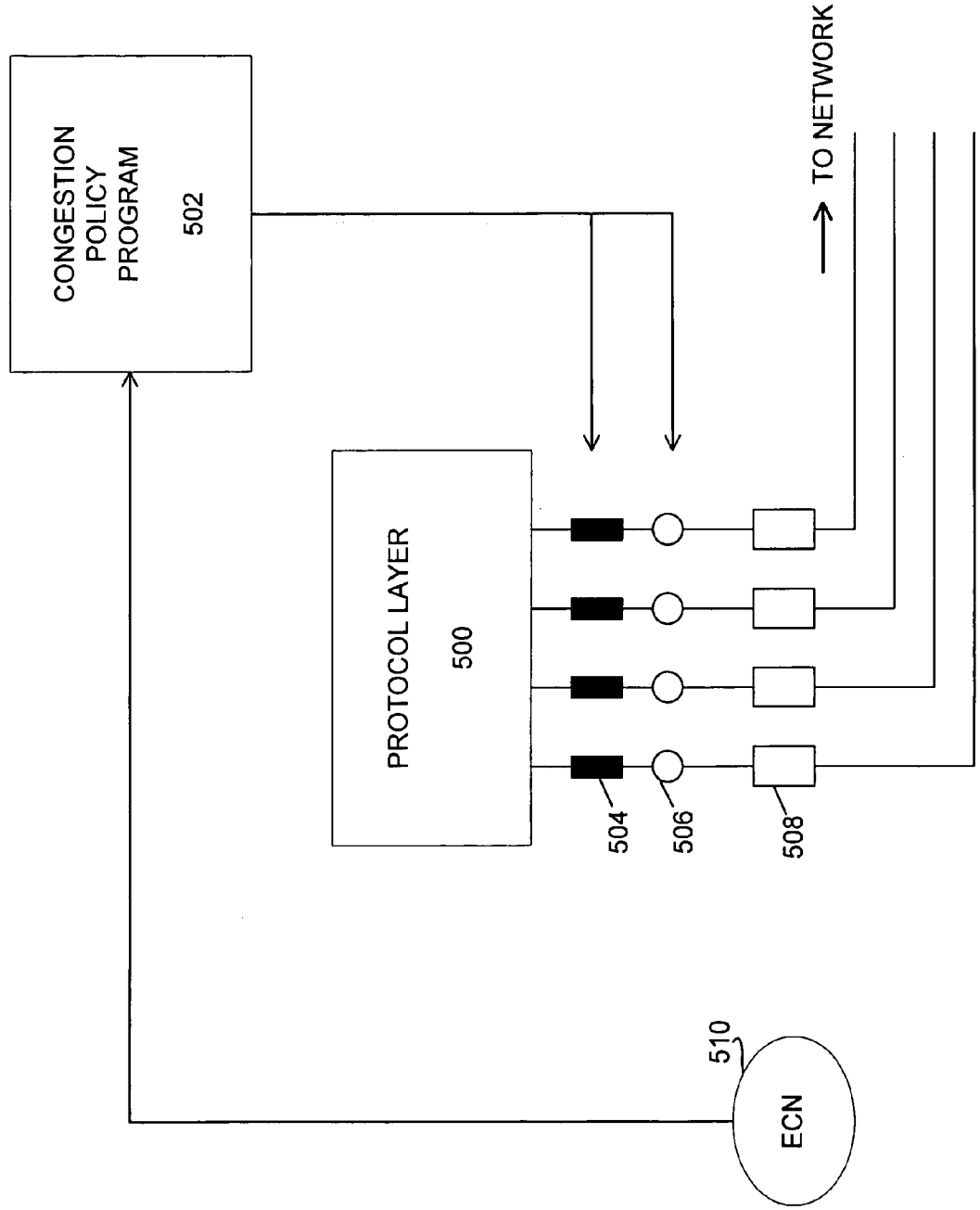

CONGESTION AVOIDANCE WITHIN AGGREGATE CHANNELS

FIELD OF THE INVENTION

This invention relates generally to avoiding congestion in networks such as Internet Protocol (IP)-based networks, and more particularly to avoiding congestion in such networks within aggregate channels.

BACKGROUND OF THE INVENTION

Computerized networks, such as the Internet, have become increasingly popular. Such networks commonly allow computers at geographically distant locations to exchange information. For example, a computer user in the United Kingdom may be able to download software from a server located in the United States.

A disadvantage that has become apparent with such networks is, however, increased congestion, slowing down the speed at which data can be communicated at particular times. For example, a computer user downloading a multimedia video clip may experience choppy playback, or playback stoppage in the middle of a clip, due to the network (e.g., the Internet) being congested to the point where all the data transmitted thereover cannot be transmitted in a timely manner. As more and more data-intensive applications have become commonplace on the Internet, such as multimedia video streaming, congestion has only gotten worse, and does not promise to let up in the future.

Explicit Congestion Notification (ECN) has been proposed as a manner by which to implement congestion avoidance, as described in K. Ramakrishnan and S. Floyd, A proposal to add Explicit Congestion Notification (ECN) to IP, Request for Comments RFC 2481, Internet Engineering Task Force, January 1999, which is hereby incorporated by reference. However, as has been proposed within this reference, ECN is very particular to TCP. This means that usage of a great amount of network bandwidth that relies on UDP or other non-TCP protocols is unaffected by ECN, such that congestion avoidance strategies cannot be triggered by ECN. Further, ECN as has been proposed within this reference relies on notifying only those users (e.g., channels) that are causing congestion, instead of all related users (or, channels), restricting the manner by which congestion can be alleviated.

For these and other reasons, there is a need for the present invention.

SUMMARY OF THE INVENTION

The invention relates to congestion avoidance within aggregate network channels. In one embodiment, a method first transmits a packet associated with a first channel of a plurality of related channels from a source protocol layer (e.g., a source IP layer) of a source through a network (e.g., the Internet). Next, the method triggers an ECN event by the packet at the network. Finally, at least one channel is determined to have decreased packets transmitted therethrough, in response to the triggering of the ECN event (e.g., based on a congestion pricing criteria).

In one particular embodiment, the method includes determining at a computer program of the source or a higher layer than the source IP layer (e.g., a UDP, TCP, or other layer) a selected channel or channels of the plurality of related channels to have reduced packets transmitted therethrough, in response the ECN event. In one particular embodiment, the ECN event is based on a congestion pricing criteria. Thus, in one particular embodiment, the source proportionally reduces the packets transmitted through the selected channel(s) according to a congestion pricing criteria.

As described, embodiments of the invention have advantages over the prior art. The ECN according to an embodiment of the invention is able to deal with all different higher layers, such as end user applications (either of the source or destination), as well as TCP, UDP, etc., and is not specific or limited to one particular type of higher layer, such as TCP.

Furthermore, in the embodiment of the invention where there are a plurality of related channels, in effect all these channels become aware of the congestion on any one thereof—that is, even if the congestion is occurring on a particular one of the channels, the situation can be alleviated by decreasing traffic on a different one or more of the channels. This means if a relatively important channel is causing the congestion, congestion can be alleviated not by decreasing transmission through this channel, but rather by decreasing transmission through another, less important, related channel.

The invention includes methods, systems, computer-readable media, and computers of varying scope. Still other aspects, embodiments, and advantages of the invention will become apparent by reference to the drawings and by review of the detailed description that follows.

DETAILED DESCRIPTION OF THE INVENTION

Figure 1:
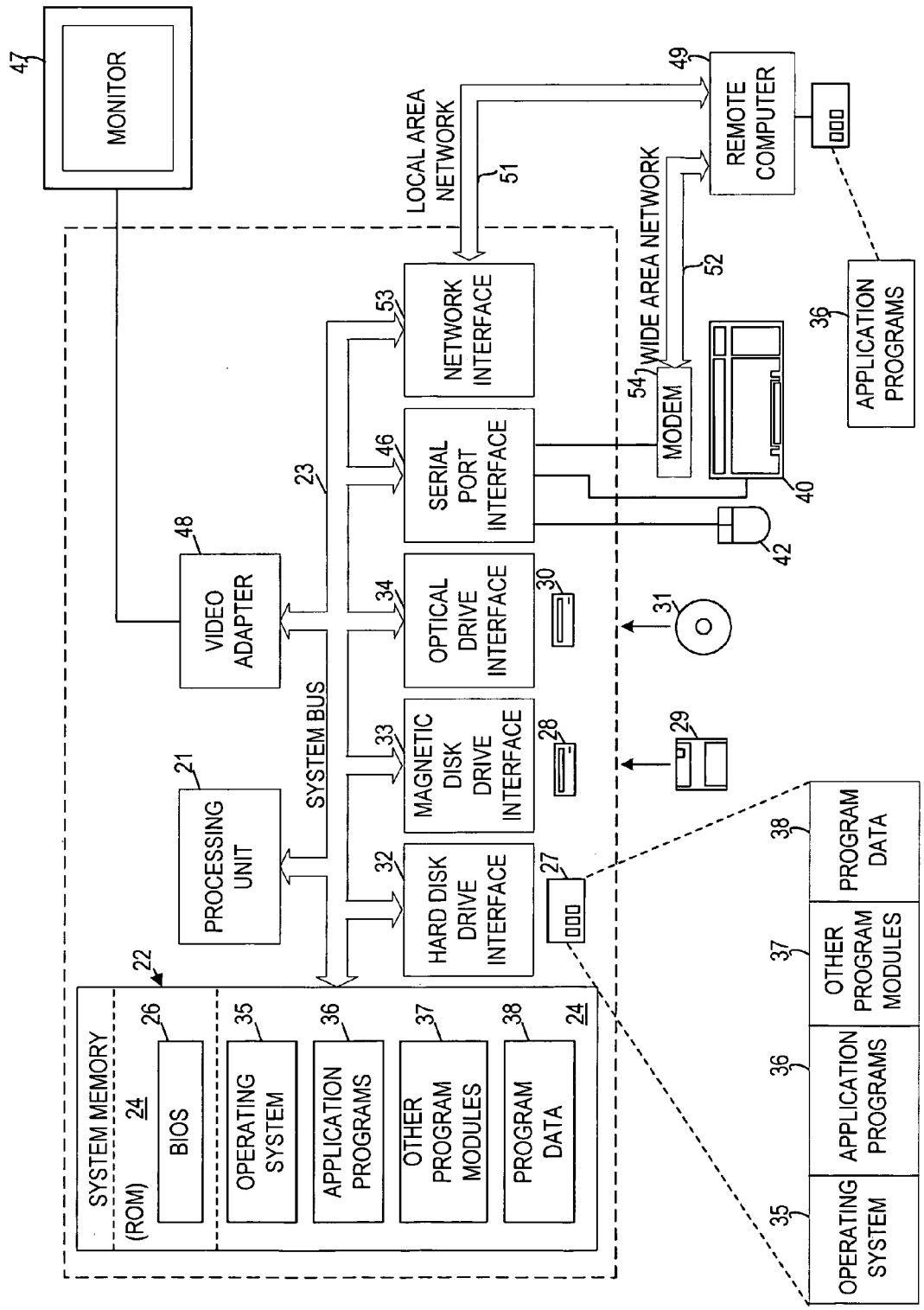
FIG. 1 is a diagram of an operating environment in conjunction with which embodiments of the invention can be practiced.

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The detailed description is divided into sections as follows. First, a description of an operating environment in conjunction with which embodiments of the invention may be practiced is provided. Next, terms and topics central to understanding embodiments of the invention are described. Following this, systems according to varying embodiment of the invention are described, relying on the terms and topics described in the previous section of the detailed description, and including a description of a specific computer embodiment of the invention. Then, methods according to varying embodiments of the invention are presented. Finally, a conclusion is provided.

Operating Environment

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internal. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Systems

In this section of the detailed description, systems according to varying embodiments of the invention are described. This section utilizes terms and topics that have been defined and explained in the previous section of the detailed description; therefore, for understanding of the systems described, reference should also be made to the previous section of the detailed description.

Figure 2:
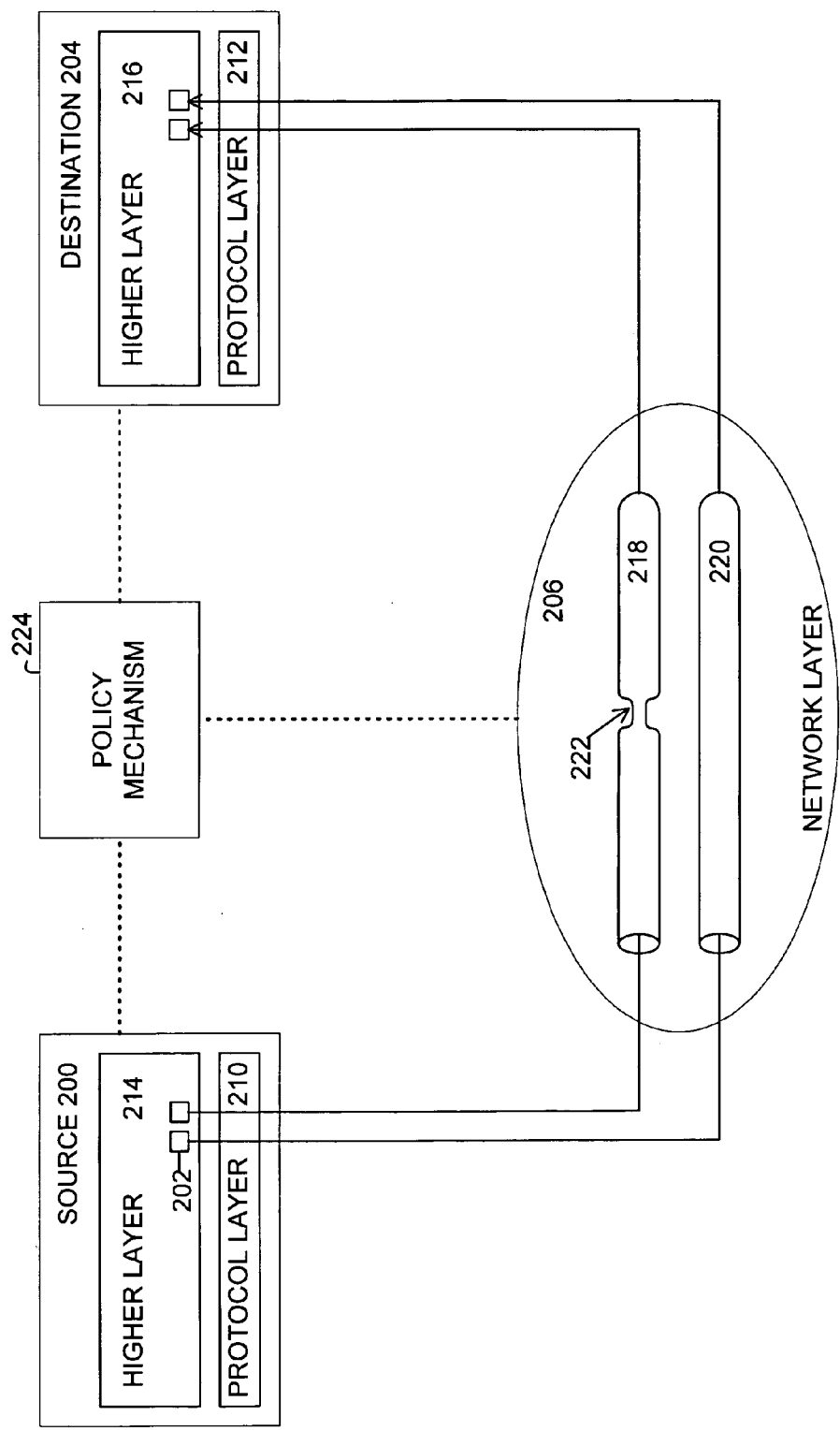
FIG. 2 is a diagram of a system according to an embodiment of the invention.

Referring first to FIG. 2, a diagram of a system according to an embodiment of the invention is shown. A source 200 sends packets of data, such as the packet 202, to a destination 204, via a network layer 206. It is noted that the term network layer, as used throughout the application, is not to be confused with the strict sense of a network layer as used in the context of protocols known within the art (e.g., the "network protocol layer"). Rather, the term as used herein extends to the mechanism that communicatively couples the source 200 to the destination 204, such as a network (e.g., the Internet), as those of ordinary skill within the art can appreciate.

Each of the source 200 and the destination 204 can be a computer—for example, in one embodiment, a computer such as has been described already in conjunction with FIG. 1 (e.g., including a processor and computer-readable media such as memory and a hard disk drive). Furthermore, each of the source 200 and the destination 204 include a protocol layer (layers 210 and 212, respectively), and one or more higher layers (such as layers 214 and 216, respectively, and which can also be protocol layers, as those of ordinary skill within the art can appreciate). The invention itself is not so limited, however. The source 200 is referred to as the source, and the destination 204 is referred to as the destination, because normally the direction of data packet transfer between the two is from the former to the latter; however, the destination 204 is still able to send packets of data to the source 200. The nomenclature is thus just indicative of which of the two is typically the source of data, and which is typically the destination of data.

The term layer generally refers to a different component of a networking system, such that each layer has assigned responsibilities and passes through data packets to other layers. For example, within a TCP/IP system, a protocol layer is the IP layer, while higher layers include the TCP layer, an application layer, as well as potentially other layers. Thus, an application layer may generate the data to be sent to a destination, while the TCP layer adds control, error-checking and other such information, and the IP layer packetizes the data and actually sends it over the network layer (for example, the Internet). When received by the destination, the IP layer depacketizes the data, the TCP layer ensures that the data was received correctly, such that it is finally received by an application layer. However, the invention is not so limited to a particular or any layered networking scheme.

As has been stated, the network layer 206 in one embodiment is the Internet, as known in the art; it can in other embodiments also be an intranet, extranet, virtual private network (VPN), any other type of network, or any combination of such networks—the invention is not so limited. As shown in FIG. 2, the network layer 206 includes an aggregate of related channels, including channels 218 and 220. The channels 218 and 220 are referred to as related according to a predetermined criteria, such that the channels connect the source 200 to the destination 204 via the same path through the network layer 206. For example, the channels may be related because they transmit the audio and video, respectively, of a teleconference, from the source 200 to the destination 204.

It is noted in particular that the channel 218 has a congestion point 222. This means that the channel 218 cannot accommodate the same transmission rate of packets therethrough as normal, or as compared with the channel 220, for instance. This may result in the delay of packets sent by the source 200 from reaching the destination 204, or in one or more data packets being lost. The congestion point 222 can result from too many packets being sent by the source 200 as compared to the advertised rate of the channel 218, for instance, or as a result of overloading of the network layer 206 in general, among other causes.

In one embodiment of the invention, an explicit congestion notice (ECN) is generated as a result of the congestion within a channel, such as the channel 218 as shown in FIG. 2. (That is, the ECN is triggered as a result of congestion generally, and specifically as a result of a packet of data transmitted through the channel causing the congestion.) ECN refers to notification in response to actual or predicted congestion within a network, such as the Internet, as caused by a given packet of data through a channel (such as an IP channel). That is, an ECN may result from actual congestion, or from the network determining that congestion will occur soon—for example, as determined in conjunction with the congestion pricing criteria, as described in a further section of the detailed description. The aim of the ECN is typically to encourage or mandate users to cooperate and so run the network in a "sensible" state, namely a mostly uncongested one.

The ECN can be generated, for instance, by the network layer 206, which notices that the channel 218 has become congested, although the invention is not so limited. Ultimately, however, a policy mechanism 224, based on the ECN, determines at least one channel of the aggregate of related channels to have decreased transmission of packets therethrough, to reduce congestion on the congested channel. Thus, in the embodiment of FIG. 2, the policy mechanism 224 can reduce packet transmission of the congested channel 218, or, significantly, can also reduce packet transmission of the non-congested channel 220, which frees up more bandwidth for the channel 218.

The invention is not particularly limited as to the manner by which the policy mechanism 224 receives notice of the ECN, nor as to the criteria by which it alleviates network congestion. Thus, as shown in FIG. 2, dotted lines extend from the policy mechanism 224 to each of the source 200, the destination 204, and the network layer 206, to indicate that the policy mechanism is able to reside in any of them. Furthermore, in one embodiment, the policy mechanism 224 is a computer program (e.g., a congestion policy program executed by the processor from the medium of the program), although again the invention is not so limited.

In the embodiment where the policy mechanism 224 resides within the source 200, feedback of the ECN to the source 200 (so that the mechanism 224 is aware that the ECN has been generated) is achieved as follows. A data packet sent by the source 200 triggering the ECN is marked to indicate the ECN has been generated. For example, one bit of the data packet may be switched on to indicate that the ECN has been generated (or, more than one data bit, depending on how much information is desired to be transferred about the congestion—e.g., where specifically within the network the congestion occurred, etc.).

The manner by which marking of data packets to indicate that the ECN has been generated is not limited by the invention, however. In one embodiment, a counter of the number of packets that should be marked is kept running, and as soon as a loss event occurs, marking is started from there until the right number has been marked (marking in this context thus refers to marking packets with ECN). In another embodiment, a threshold is set, probabilistically marking packets in the queue once this threshold is exceeded. In still another embodiment, a virtual queue is run, with reduced rate and capacity, and packets are marked accordingly.

Once the data packet has reached the destination 204, the destination 204 sends a return packet also having its ECN bit turned on, so that upon receipt at the source 200, the policy mechanism 224 is aware that the ECN has been generated. However, the invention is not so limited—the feedback of the ECN can occur in other manners, as well. Thus, when the policy mechanism 224, in the embodiment where it resides within the source 200, learns of the ECN, it must then determine which of the aggregate of related channels to decrease throughput on. In one embodiment, this is performed in conjunction with the congestion pricing criteria as is been described elsewhere in this application—that is, the congestion pricing criteria determines the reaction made by the mechanism 224: which channel should have reduced bandwidth, and by how much.

In another embodiment of the invention the policy mechanism 224 resides within the destination 204. In such a situation, for example, the mechanism 224 may receive knowledge of the ECN by the packet of data sent by the source 200 that triggered the ECN having a marked bit, such that the data packet is ultimately received by the mechanism 224. The mechanism 224 then is able to determine which of the aggregate of channels is to have reduced throughput, such that this information is conveyed to the source 200 (e.g., via a data packet sent by the destination 204, or by another mode of communication, etc.), so that the source 200 knows which channel to throttle back on. Once this determination is made, the mechanism 224 then causes the reduced throughput based on its recommendation, in a manner not limited by the invention.

In another embodiment, the policy mechanism 224 resides within the network layer 206. Thus, as soon as an ECN is generated by the network layer 206, the mechanism 224 receives notice thereof, and is able to determine which channel should have reduced throughput. Again, however, the mechanism 224 must communicate this information to the source 200, so that the source can implement the policy to reduce throughput on the selected channel.

Figure 3:
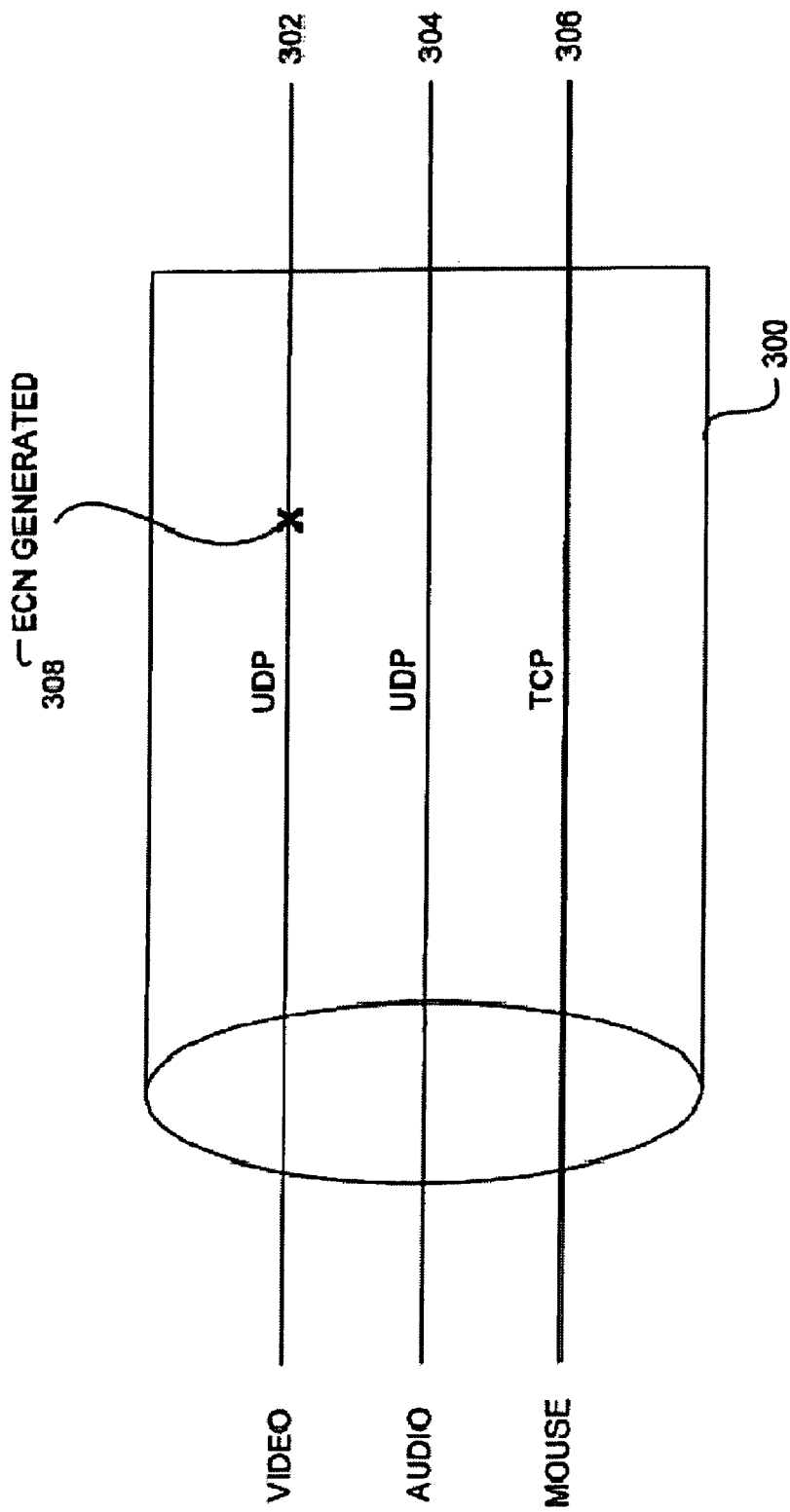
FIG. 3 is a diagram of an aggregate of channels, according to an embodiment of the invention.

For further understanding of embodiments of the invention, reference is now made to FIG. 3, which is a diagram showing an aggregate of three related channels. Specifically, within a network layer 300 are channels 302, 304 and 306, where 302 is used by a source for communication of video information of a teleconference transmitted by the UDP protocol known within the art, 304 is used by the source for communication of audio information of the teleconference also transmitted by the UDP protocol, and 306 is used by the source for communication of mouse click information of the teleconference (i.e., assuming a computer teleconference) transmitted by the TCP protocol known within the art.

Thus, if an ECN is generated on channel 302, indicating that this channel is congested (perhaps, for example, as a result of the high bandwidth required by video data), then the policy mechanism—not shown in FIG. 3—must determine which of the channels 302, 304 and 306 to reduced packet transmission on in order to decrease network congestion. For example, based on the criteria used by the mechanism, the decision may be made to decrease the video data throughput of itself (since this would cause only a degradation in the quality of the video data, and not a complete loss of the signal), or decrease the audio data throughput, or the mouse data throughput—even though the latter two did not contribute to the network congestion.

Referring next to FIG. 5, a diagram of a computer according to an embodiment of the invention is shown. The computer includes a protocol layer 500, a congestion policy computer program 502 (which can be executed by a processor of the computer from a computer-readable medium such as a memory thereof, both of which are not shown in FIG. 5), a plurality of queues (e.g., buffers) such as queue 504, and a corresponding plurality of filters such as filter 506. The latter each couple to a different one of an aggregate of related channels, such as channel 508, which connect with and through a network or network layer not shown in FIG. 5. furthermore, the policy program 502 is responsive to an ECN 510.

The protocol layer 500 is the layer that packetizes data for transmission through the network, and can be either a destination protocol layer of a destination computer, or a source protocol layer of a source computer (that is, the computer of FIG. 5 can be either a source or a destination computer). It can be said to include the plurality of related channels, such as the channel 508. More specifically, access from the protocol layer 500 to the plurality of related channels is controlled by the plurality of queues, such as the queue 504, and the plurality of filters, such as the filter 506.

Each queue has a modifiable depth, such that in one embodiment a new data packet cannot enter a queue until there is an empty space. Controlling queue depth, thus, is one manner by which a channel can be throttled back—reducing its queue depth causes the channel to be throttled back. Likewise, each filter is able in one embodiment of the invention to specify the specific rate at which data packets leave the queue to enter the channel, as well as in one embodiment the types of data packets that are so allowed to enter the channel. Thus, controlling the criteria of a filter as to when and which packets it allows to proceed to the channel is another manner by which a channel can be throttled back.

The congestion policy program 502 determines at least one channel of the plurality of related channels to have decreased transmission of packets therethrough, such as at least one channel other than a congested channel, in response to the ECN 510. That is, assuming that one of the plurality of related channels, such as the channel 508, becomes congested as a result of a data packet being sent (in particular), the network generates an ECN 510, feedback regarding which is received by the program 502. The program 502 can determine which channel or channels to reduce transmission through, and how much to reduce transmission, via any criteria, such as a congestion pricing criteria. Moreover, the program 502 can in one embodiment implement this determination by modifying the filters and the queues of the affected channels, so that the channel only transmits the desired amount of data packets.

Method

Figure 4:
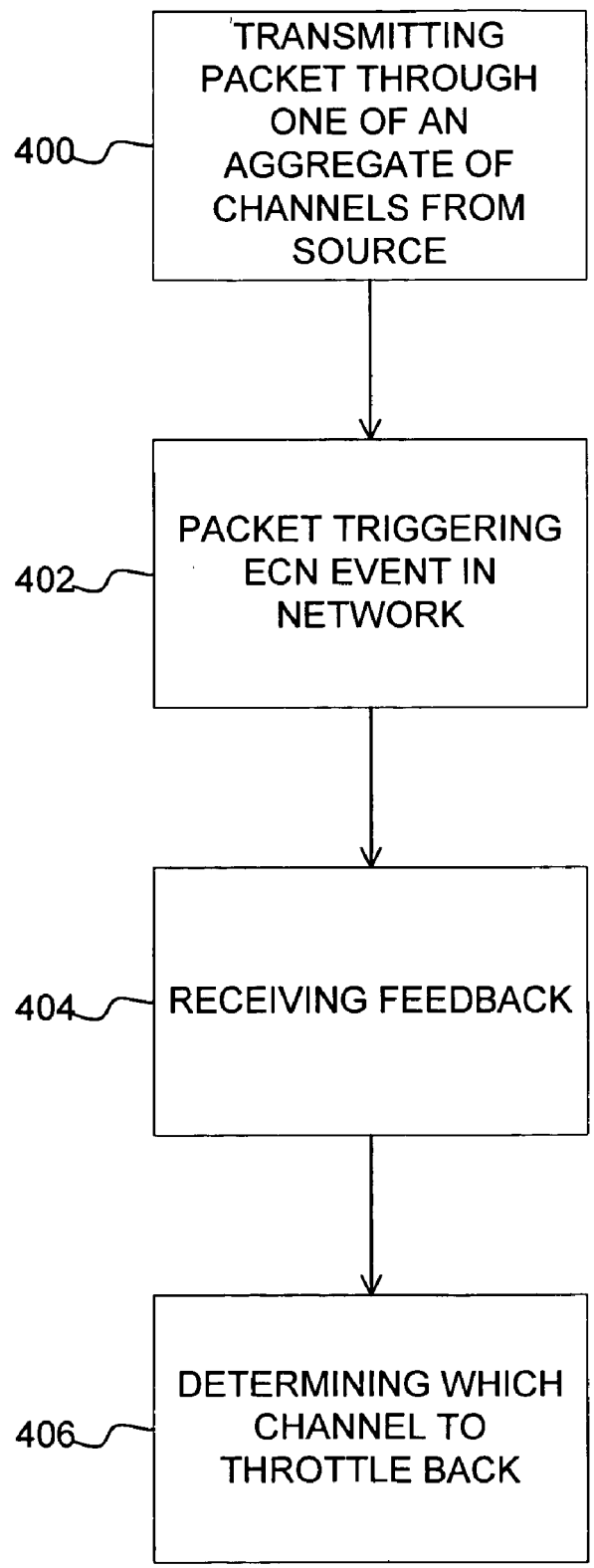
FIG. 4 is a flowchart of a method according to an embodiment of the invention; and, FIG. 5 is a diagram of a computer according to one embodiment of the invention.

A computer-implemented method according to an embodiment of the invention is shown in FIG. 4. The computer-implemented method is desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer.

Referring now to FIG. 4, in 400, a data packet associated with a first channel of an aggregate of related channels is transmitted, from a source protocol layer of a source, through a network. As has been described, the channels within the aggregate are related in that they have a common source and a common destination. The source protocol layer can be one of many different layers within the source, which can also including such higher level layers as end-user applications, and intermediate control layers, such as a TCP layer as known within the art. The source in one embodiment is a computer, for example, as has been described in conjunction with FIG. 1 already. The source protocol layer is an IP protocol layer, as has been described. Furthermore, in one embodiment, the network comprises the Internet, a virtual private network, an intranet, an extranet, or a combination of two or more of these, although again the invention is not so limited.

In 402, an ECN event is triggered by the packet at the network. The packet, in being transmitted from the source protocol layer of the source and through the network, is thus congesting the network, causing the network in response to indicate this by generating an ECN event. The manner by which the ECN event is triggered is also not limited by the invention. Thus, the ECN event can be triggered in accordance with a congestion pricing criteria, as is described in the next section of the detailed description, and can result in a marking of one of at least one bit of the data packet that triggered the ECN, by the network.

In 404, feedback is received of the ECN event. The feedback is received at one or more of the source; a destination having a destination protocol layer and one or more upper layers (in other words, comparable to the source) that is the intended receiver of packets of data sent by the source; and the network. Thus, the generation of the ECN event in 402 does not necessarily mean in some embodiments of the invention that the source, destination and/or network is able to be aware of the ECN. Therefore, in 404, the desired one or more of these networking system components receives feedback as a manner by which they become aware of the ECN.

Furthermore, the feedback may be received at any layer of the destination or source—e.g., the protocol layer, a higher layer such as a control layer like TCP, or an even still higher layer such as an end-user application layer. In general, the layer that receives feedback is the location where the policy mechanism, described in the previous section of the detailed description, resides. The feedback thus may be received at a computer program of a higher layer of the source or the destination.

Where the source is to receive feedback of the ECN, it is noted that in at least one embodiment of the invention, the destination is to provide this feedback to the source. That is, the packet marked with the ECN and sent by the source is received at the destination. Thus, the destination then communicates its receipt of a packet marked with the ECN. This can be done in one embodiment by sending back a data packet to the source (specifically, from a protocol layer of the destination, herein referred to as the destination protocol layer), to indicate that it received a packet marked with the ECN, or communicating through another manner.

Finally, in 406, at least one channel is determined to have decreased packets transmitted therethrough, in response to the triggering of the ECN event. This is pursuant to as has been described in the previous section of the detailed description. Thus, to reduce congestion, at least one of the aggregate of channels must have its throughput decreased—either including or not including the channel through which the packet triggering the ECN. In one embodiment, the at least one channel is determined in accordance with a congestion pricing criteria, as has been described, although the invention is not so limited.

In one embodiment, the determination is made by a policy mechanism, as has been described, which resides at one of the source, the destination and the network. Thus, the determination is made by one of the source, the destination and the network as well. In the case of the destination and the source, the determination may be made at any layer thereof, including the protocol layer (e.g., the IP layer), the control layer (e.g., the TCP layer), and any other higher layer, such as an end-user application layer. The invention is not so limited.

Congestion Pricing Criteria

At least some embodiments of the invention utilize a specific congestion pricing criteria, now described, to achieve reduced throughput on one or more of a set of related channels, to avoid, prevent, or alleviate network congestion. That is, the congestion pricing criteria described is one manner by which such network congestion can be avoided, prevented, or alleviated.

The basic framework of a congestion pricing criteria according to one embodiment of the invention has two primary elements. First, the network supplies feedback to the users (which can be end-user applications, a higher layer, a protocol layer, etc.), which reflects the cost of congestion (more precisely, the shadow price of congestion). Second, the users incur some cost associated with their actions, but otherwise can react as they please.

It is assumed that the cost of congestion is the number of lost packets. Then, all packets contributing to a loss should be marked, such as by an ECN mark, to reflect the shadow price of congestion. In other words, if there is a load y on a resource, incurring cost at rate C(y), the congestion price of shadow price is the derivative $$p(y) = \frac{d}{dy}C(y).$$

If the load y is a random variable and the cost is taken to be the expected rate of loss, then the marking strategy in a single buffer returns the appropriate derivative information, scaled by the load.

Furthermore, it is supposed that a finite number of users R (indexed by r) use a finite set of resources J (indexed by j), where the 0–1 incidence matrix $A_{jr}$ indicates whether user r uses resource j or not. An elastic user's preference for the amount of bandwidth $x_r$ is characterized by a concave utility function $U_r(x)$. Thus a user would seek to maximize the total net utility, maximizing $$\sum_r U_r(x_r) - \sum_j C_j\left(\sum_r A_{jr} x_r\right),$$

over $x_r \geq 0$; r∈R. This optimization problem has the solution, for non-zero $x_r$, $$U'_r(x_r) \equiv \frac{d}{dx_r} U_r(x_r) = \sum_{j \in r} p_j(y_j)$$

where j∈r is the set $\{j:A_{jr}=1\}$, with a corresponding load on resource j given by $$y_j = \sum_r A_{jr} x_r.$$

That is, at the social optimum, the derivative of a user's utility function exactly matches the sum of the shadow prices of all resources along the user's route.

Usually, the network has no knowledge about the users' utility functions. However, if a user is charged at a rate proportional to the amount of bandwidth $x_r$ received, for example, at a rate $t_r x_r$, users will seek to maximize their net return, that is, they will try to maximize $$U_r(x_r) - t_r x_r$$

over $x_r \geq 0$. Thus, if the prices are right, namely if $$t_r = \sum_{j \in r} p_j(y_j)$$

and if each user acts to maximize his or her own net benefit, then they will at the same time evolve towards the system of social optimum. As the network load changes, the network may need to update its prices.

Therefore, the feedback signal $$x_r \sum_{j \in r} p_j(y_j)$$

is used, where feedback for a stream should be proportional to the stream and also proportional to the shadow prices (congestion costs) along the route.

If each user r uses the updating equation $$\frac{d}{dt} x_r(t) = \kappa_r \left( x_r(t) U'_r(x_r(t)) - x_r(t) \sum_{j \in r} p_j(y_j(t)) \right)$$

for some positive gain parameter $\kappa_r$, where $$y_j(t) = \sum_{j \in r} x_r(t),$$

then, provided the utility function is strictly concave and the cost function is strictly convex, defined over $x \geq 0$, solutions will converge to the unique equilibrium.

This convergence is specifically now proved. A function is first defined, $$\Psi(x) = \sum_j U_r(x_r) - \sum_j C_j\left(\sum_{j \in s} x_s(t)\right).$$

Under the concave and convex assumptions on the functions U and C, respectively, $\Psi$ is a Lyapunov function for the differential equation $$\frac{d}{dt} x_r(t) = \kappa_r \left( x_r(t) U'_r(x_r(t)) - x_r(t) \sum_{j \in r} p_j(y_j(t)) \right)$$

in which all trajectories converge to the vector x maximizing this function. This is unique for strictly concave U and strictly convex C, and interior to the region. Next, consider $$\frac{\partial}{\partial x_r} \Psi(x) = U'_r(x_r(t)) - \sum_{j \in r} p_j(y_j(t));$$

setting these derivatives to zero yields the maximum. Differentiating with respect to t gives $$\frac{d}{dt} \psi(x(t)) = \sum \kappa_r x_r(t) \left( U'_r(x_r(t)) - \sum_{j \in r} p_j(y_j(t)) \right)^2$$

which is strictly positive except when x is the equilibrium value—hence $\Psi$ is a Lyapunov function, and the result proved.

It is also noted that for utility functions of the form $$U_r(x_r) = w_r \log x_r$$

for some willingness-to-pay constant $w_r$, at the optimum, $$w_r = x_r \sum_{j \in r} p_j(y_j).$$

The resulting allocation is proportionally fair, which is related to a Nash arbitration scheme, as known within the art.

Next, it is shown how such an allocation can be applied to arbitrary utility functions if $w_r$ is treated as input to the user's control algorithm in place of true preferences. First, it is supposed that each user r uses the updating equation $$\frac{d}{dt} x_r(t) = \kappa_r \left( w_r(t) - x_r(t) \sum_{j \in r} p_j(y_j(t)) \right)$$

and updates $w_r$ according to $$w_r(t) = x_r(t) U'_r(x_r(t)).$$

In this case, too, the solution converges to the global optimum.

It is noted that this holds true even if instead a user is mandated to use a certain updating function, subject to certain conditions. This can be the case if a user or end-system has a restricted choice of flow-control options, for example.

This case of mandated controls is now proved. The updating equation is considered for some fixed concave functions $F_r$. It is supposed the derivative of $F_r$ has a continuous inverse, and that there are some proxy variables $w_r$ with associated functions $g_r$ satisfying $$F'_r(x_r) = p_r$$

$$x_r = w_r g_r(p_r).$$

Therefore, there are vectors $w = (w_r, r \in R), x = (x_r, r \in R), p = (p_r, r \in R)$ such that if $w_r$ solves the user problem, which maximizes $$U_r(w_r g_r(p_r)) - p_r w_r g_r(p_r) \text{ over } w_r \geq 0,$$

then x also solves the system optimum. In this case the $p_r$ are the sum of the shadow prices along a route r.

Thus, in the case when the optimum lies in the interior of a region, the equation $$\frac{d}{dt} x_r(t) = \kappa_r \left( w_r(t) - x_r(t) \sum_{j \in r} p_j(y_j(t)) \right)$$

converges to the unique equilibrium satisfying $$F'_r(x_r) = \sum_{j \in r} p_j(y_j)$$

but at the user optimum $$U'_r(x_r) = p_r.$$

Therefore, using $$F'_r(x_r) = p_r$$

$$x_r = w_r g_r(p_r),$$

this is a solution to the problem previously described as $$U'_r(x_r) \equiv \frac{d}{dx_r} U_r(x_r) = \sum_{j \in r} p_j(y_j),$$

completing the proof.

Next, the case where a user has a number of streams that are related, which is equivalent to the case where the "users" are not independent, is considered. This can model a multimedia connection, for example. The case where a user r may have a utility function $U_r(\vec{x}_r)$ that is a function of several variables is considered. Provided that this is a concave function, the user optimum still converges to the system optimum, provided that downhill steps are taken, but now the user can choose the extra information to alter the adaptation. For instance, steepest descent or gradient projection methods, as known within the art, can be used to change the way the user reacts, which equate to trading off marks between streams, and altering rates of convergence.

This case of correlated feedback is now more specifically considered. Two related streams are considered, and for simplicity it is assumed that they use the same set of resources. The component feedback signals are then $$x_i \frac{\partial U_r(x_i)}{\partial x_i} - x_i \sum_{j \in r} p_j(y_j) \; i = 1, 2,$$

which can be scaled in any manner to update the vector $(x_1, x_2)$. It is noted that this is equivalent to changing $\kappa_i$. Marks can also be traded among streams, in one embodiment, using correlated information to increase reaction speed. For example, a proportion of stream 2 marks to reduce stream 1 can be used, provided this stops when a boundary or optimum is reach, namely when $$\frac{\partial U_r(x_i)}{\partial x_i} = \sum_{j \in r} p_j(y_j).$$

CONCLUSION

Congestion avoidance within aggregate channels has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computer-implemented method comprising:
receiving a signal indicative of an occurrence of an ECN event caused by congestion within a channel in a network communication link comprising an aggregate of a plurality of related channels connecting a source to a destination via the network communication link, wherein the signal indicating the ECN event is detectable in the source, the destination and the network; and
based on the signal indicating the ECN event occurrence, selecting, according to a congestion pricing criteria, at least one channel of the aggregate of the plurality of related channels to have decreased packets transmitted therethrough for alleviating the congestion; and decreasing the packets transmitted on the at least one selected channel by modifying filters and queues of the at least one selected channel.

2. The method of claim 1, wherein the network comprises the Internet, and the source comprises an IP protocol layer.

3. The method of claim 1, wherein receiving the signal indicative of the ECN event occurrence comprises receiving the signal at one of the source and the network.

4. The method of claim 1, wherein selecting the at least one channel to have decreased packets transmitted therethrough comprises selecting the at least one channel at one of the source and the network.

5. The method of claim 1, wherein receiving the signal indicative of the ECN event occurrence comprises receiving the signal at a layer higher than a source protocol layer and selecting the at least one channel to have decreased packets transmitted therethrough comprises selecting the at least one channel at the layer higher than the source protocol layer.

6. The method of claim 1, wherein receiving the signal indicative of the ECN event occurrence comprises receiving the signal at a computer program at the source and selecting the at least one channel to have decreased packets transmitted therethrough is implemented by the computer program at the source.

7. The method of claim 1, wherein receiving the signal indicative of the ECN event occurrence comprises receiving the signal at the destination at which the packet transmitted is received, and selecting the at least one channel to have decreased packets transmitted therethrough comprises selecting the at least one channel at the destination.

8. The method of claim 1, wherein receiving the signal indicative of the ECN event occurrence comprises receiving a packet sent by a destination protocol layer of the destination indicating the ECN event at the source.

9. The method of claim 8, wherein selecting the at least one channel to have decreased packets transmitted therethrough comprises selecting the at least one channel at the source.

10. The method of claim 1, wherein the aggregate of related channels comprises a video channel and an audio channel.

11. A computerized system comprising:
a network layer having a network communications link comprising an aggregate of a plurality of related channels therethrough, and triggering an ECN event in response to congestion within one of the aggregate of related plurality of channels during transmission of a packet from a source having a source protocol layer to a destination having a destination protocol layer, wherein the triggered ECN event is detectable at the source, and the destination; and,
a policy mechanism to select, according to a congestion pricing criteria, at least one channel of the aggregate of related plurality of channels other than the congested channel to have decreased transmission of packets therethrough based on the ECN event for alleviating the congestion and, decreasing the packets transmitted on the at least one selected channel by modifying filters and queues of the at least one selected channel.

12. The system of claim 11, wherein the network layer comprises the Internet.

13. The system of claim 11, wherein at least one of the source protocol layer and the destination protocol layer comprises an IP layer.

14. The system of claim 11, wherein the policy mechanism resides at the network layer.

15. The system of claim 11, wherein the policy mechanism resides at the source.

16. The system of claim 15, wherein the destination is to send the source a packet indicating the ECN event so that the source detects the occurrence of the ECN event.

17. The system of claim 15, wherein one of the destination and the network layer is to indicate to the source that the ECN event has been triggered via a source layer higher than the source protocol layer.

18. The system of claim 11, wherein the policy mechanism resides at the destination.

19. The system of claim 18, wherein the destination is to communicate to the source the at least one channel to have decreased transmission of packets therethrough.

20. The system of claim 11, wherein the ECN event is based on a congestion pricing criteria.

21. The system of claim 11, wherein the aggregate of related channels comprises a video channel and an audio channel.

22. A computer comprising:
a processor;
a computer-readable medium;
a protocol layer having a network communications link comprising an aggregate of related plurality of channels connecting a source to a destination via the network communications link, the aggregate of related plurality of channels including a congested channel; and
a congestion policy program executed by the processor from the medium, wherein the congestion policy program is responsive to an ECN event triggered within the congested channel due to a congestion during transmission of packets from the source to the destination and, wherein the ECN event is detectable within the source and the destination, for selecting, according to a congestion pricing criteria, at least one channel of the aggregate of related channels other than the congested channel to have decreased transmission of packets therethrough based on the ECN event triggered within the congested channel to alleviate the congestion and, the congestion policy program being further operative for decreasing the packets transmitted on the at least one selected channel by modifying filters and queues of the at least one selected channel.

23. The computer of claim 22, wherein the protocol layer comprises a source protocol layer.

24. The computer of claim 22, wherein the protocol layer comprises a destination protocol layer.

25. The computer of claim 22, wherein the aggregate of related channels comprises a video channel and an audio channel.

26. A machine-readable medium having processor instructions stored thereon for execution by a processor, the medium causing performance of a method comprising:

receiving feedback of an ECN event triggered due to a congestion occurrence in one of an aggregate of related plurality of channels within a network communications link connecting a source protocol layer to a destination protocol layer, wherein the feedback is detectable at the source and the destination; and selecting, according to a congestion pricing criteria, at least one channel of the aggregate of related plurality of channels to have decreased packets transmitted therethrough, based on the ECN event for alleviating the congestion and;

decreasing the packets transmitted on the at least one selected channel by modifying filters and queues of the at least one selected channel.

27. The medium of claim 26, wherein the network comprises the Internet, and the source protocol layer comprises an IP protocol layer.

28. The medium of claim 26, wherein selecting the at least one channel to have decreased packets transmitted therethrough comprises selecting the at least one channel at one of the source and the network.

29. The medium of claim 26, wherein receiving feedback of the ECN event comprises receiving feedback at a layer higher than the source protocol layer and selecting the at least one channel to have decreased packets transmitted therethrough comprises selecting the at least one channel at the layer higher than the source protocol layer.

30. The medium of claim 26, wherein receiving feedback of the ECN event comprises receiving feedback at a computer program at the source and selecting the at least one channel to have decreased packets transmitted therethrough is implemented by the computer program at the source.

31. The medium of claim 26, wherein receiving feedback of the ECN event comprises receiving feedback at the destination at which the packet transmitted is received, and selecting the at least one channel to have decreased packets transmitted therethrough comprises selecting the at least one channel at the destination.

32. The medium of claim 26, wherein receiving feedback of the ECN event comprises receiving a packet sent by the destination protocol layer of the destination indicating the ECN event at the source.

33. The medium of claim 32, wherein selecting the at least one channel to have decreased packets transmitted therethrough comprises selecting the at least one channel at the source.

34. The medium of claim 26, wherein selecting the at least one channel to have decreased packets transmitted therethrough comprises selecting the at least one channel at a layer higher than the source protocol layer.

35. The medium of claim 26, wherein selecting the at least one channel to have decreased packets transmitted therethrough comprises selecting the at least one channel at a layer higher than the destination protocol layer receiving the packet sent by the source protocol layer.

36. The medium of claim 26, wherein the aggregate of related channels comprises a video channel and an audio channel.

37. A computer comprising:
a source protocol layer;
a plurality of filters;
a network communication link comprising an aggregate of related plurality of channels connecting a source protocol layer to a destination protocol layer in a network layer, each channel of the plurality of related channels associated with a filter; and
a policy mechanism, responsive to an ECN event triggered due to a congestion during transmission of packets from the source protocol layer to the destination protocol layer via the network layer, wherein the ECN event is detectable within the source protocol layer and the destination protocol layer, the policy mechanism operative for selecting, based on the ECN event and a congestion pricing criteria, at least one channel of the aggregate of related plurality of channels to have decreased packets transmitted therethrough from the source protocol layer through the plurality of filters to alleviate the congestion and, the policy mechanism being further operative for decreasing the packets transmitted on the at least one selected channel by modifying the filters and queues associated with the at least one selected channel.

38. The computer of claim 37, further comprising at least one queue, each queue associated with one of the filters.

39. The computer of claim 37, wherein the aggregate of related channels comprises a video channel and an audio channel.

40. A computer-implemented method for alleviating congestion in a network communication link, the link comprising an aggregate of a plurality of related channels connecting a source to a destination via the network communication link, the method comprising:

receiving a signal indicative of an occurrence of an ECN event caused by congestion within a channel in the network communication link, wherein the signal indicating the ECN event is detectable at the source, the destination and the network; and based on the signal indicating the ECN event occurrence, selecting, according to a cost associated with the congestion, at least one channel other than the congested channel from the aggregate of the plurality of related channels, to have decreased packets transmitted therethrough for alleviating the congestion in the congested channel and;

decreasing the packets transmitted on the at least one selected channel by modifying filters and queues of the at least one selected channel.

* * * * *

UNITED STATES PATENT AND TRADEMARK OFFICE
CERTIFICATE OF CORRECTION

| | | |
|---|---|---|
| PATENT NO. | : 7,023,800 B1 | Page 1 of 1 |
| APPLICATION NO. | : 09/323767 | |
| DATED | : April 4, 2006 | |
| INVENTOR(S) | : Derek McAuley et al. | |

It is certified that error appears in the above-identified patent and that said Letters Patent is hereby corrected as shown below:

On the title page, item (56), under "U.S. Patent Documents", in column 2, line 2, after "6,389,555" delete "B1" and insert -- B2 --, therefor.

On the title page, item (56), under "Foreign Patent Documents", in column 2, line 1, after "4/1998" insert -- H04Q/11/04 --.

On page 2, item (56), under "Other Publications", in column 1, line 1, delete "Theorty" and insert -- Theory --, therefor.

On page 2, item (56), under "Other Publications", in column 1, line 5, delete "Requeset" and insert -- Request --, therefor.

In column 5, line 2, delete "Internal" and insert -- Internet --, therefor.

In column 5, line 11, delete "Internal" and insert -- Internet --, therefor.

In column 8, line 37, delete "furthermore" and insert -- Furthermore --, therefor.

Signed and Sealed this

Twenty-third Day of March, 2010

David J. Kappos
*Director of the United States Patent and Trademark Office*